United States Patent

Ogata

[11] Patent Number: 5,757,543
[45] Date of Patent: May 26, 1998

[54] KEPLERIAN VARIABLE MAGNIFICATION FINDER

[75] Inventor: Yasuzi Ogata, Akiruno, Japan

[73] Assignee: Olympus Optical Co. Ltd., Tokyo, Japan

[21] Appl. No.: 607,644

[22] Filed: Feb. 27, 1996

[30] Foreign Application Priority Data

Feb. 28, 1995 [JP] Japan ............................ 7-040407

[51] Int. Cl.$^6$ ............................ G02B 23/00; G02B 23/14
[52] U.S. Cl. ............................ 359/432; 359/422; 359/431
[58] Field of Search ............................ 359/362, 420–423, 359/431–433, 676–678, 689–690; 396/373–386

[56] References Cited

U.S. PATENT DOCUMENTS

| | | | |
|---|---|---|---|
| 4,906,078 | 3/1990 | Inabata et al. | 359/676 |
| 5,052,787 | 10/1991 | Sugawara | 359/708 |
| 5,144,349 | 9/1992 | Kato et al. | 359/431 |
| 5,144,480 | 9/1992 | Ohshita | 359/432 |
| 5,231,534 | 7/1993 | Kato | 359/432 |
| 5,381,265 | 1/1995 | Ohshita | 359/422 |
| 5,576,889 | 11/1996 | Miyazaki | 359/676 |

FOREIGN PATENT DOCUMENTS

| | | | |
|---|---|---|---|
| 4-56814 | 2/1992 | Japan | 359/676 |
| 4-219711 | 8/1992 | Japan | |
| 6-51201 | 2/1994 | Japan | |
| 6-160709 | 6/1994 | Japan | 359/676 |

*Primary Examiner*—Thong Nguyen
*Attorney, Agent, or Firm*—Cushman Darby & Cushman IP Group of Pillsbury Madison & Sutro LLP

[57] ABSTRACT

A Keplerian variable magnification finder includes, in order from the object side, an objective system having a positive refracting power as a whole; an image erecting system for erecting an intermediate image formed by the objective system; and an eyepiece system having a positive refracting power as a whole. The objective system including a first lens unit having a negative refracting power; a second lens unit having a positive refracting power; and a third lens unit having a positive refracting power. When the magnification of the finder is changed, the second and third lens units can be moved along the optical axis. The objective system satisfies the following conditions at the same time:

$$0.1 < |f_1|/(f_S Z) < 0.4$$

$$0.2 < f_3/(f_S Z) < 0.53$$

where $f_1$ is the focal length of the first lens unit, $f_3$ is the focal length of the third lens unit, $f_S$ is the intermediate focal length of the objective system ($f_S = (f_W f_T)^{1/2}$ when focal lengths of the objective system at low and high magnification positions are represented by $f_W$ and $f_T$ respectively), and Z is a variable magnification ratio ($Z = f_T/f_W$).

14 Claims, 8 Drawing Sheets

SPHERICAL ABERRATION
D=5.0mm

-2.0  (m⁻¹)  2.0

ASTIGMATISM
$\omega$ =25.20°

-2.0  (m⁻¹)  2.0

DISTORTION
$\omega$ =25.20°

-10  (%)  10.

SPHERICAL ABERRATION
D=5.0mm

-2.0  (m⁻¹)  2.0

ASTIGMATISM
$\omega$ =15.40°

-2.0  (m⁻¹)  2.0

DISTORTION
$\omega$ =15.40°

-10  (%)  10.

SPHERICAL ABERRATION
D=5.0mm

-2.0  (m⁻¹)  2.0

ASTIGMATISM
$\omega$ =9.50°

-2.0  (m⁻¹)  2.0

DISTORTION
$\omega$ =9.50°

-10  (%)  10.

SPHERICAL ABERRATION
D=5.0mm

-2.0   (m⁻¹)   2.0

ASTIGMATISM
ω=25.15°

-2.0   (m⁻¹)   2.0

DISTORTION
ω=25.15°

-10   (%)   10.

SPHERICAL ABERRATION
D=5.0mm

-2.0   (m⁻¹)   2.0

ASTIGMATISM
ω=15.25°

-2.0   (m⁻¹)   2.0

DISTORTION
ω=15.25°

-10   (%)   10.

SPHERICAL ABERRATION
D=5.0mm

-2.0   (m⁻¹)   2.0

ASTIGMATISM
ω=9.50°

-2.0   (m⁻¹)   2.0

DISTORTION
ω=9.50°

-10   (%)   10.

SPHERICAL ABERRATION
D=5.0mm

-2.0   (m⁻¹)   2.0

ASTIGMATISM
$\omega$ =25.20°

-2.0   (m⁻¹)   2.0

DISTORTION
$\omega$ =25.20°

-10   (%)   10.

SPHERICAL ABERRATION
D=5.0mm

-2.0   (m⁻¹)   2.0

ASTIGMATISM
$\omega$ =15.35°

-2.0   (m⁻¹)   2.0

DISTORTION
$\omega$ =15.35°

-10   (%)   10.

SPHERICAL ABERRATION
D=5.0mm

-2.0   (m⁻¹)   2.0

ASTIGMATISM
$\omega$ =9.55°

-2.0   (m⁻¹)   2.0

DISTORTION
$\omega$ =9.55°

-10   (%)   10.

SPHERICAL ABERRATION
D=4.0mm

-2.0   (m⁻¹)   2.0

ASTIGMATISM
ω=25.20°

-2.0   (m⁻¹)   2.0

DISTORTION
ω=25.20°

-10   (%)   10.

SPHERICAL ABERRATION
D=4.0mm

-2.0   (m⁻¹)   2.0

ASTIGMATISM
ω=13.35°

-2.0   (m⁻¹)   2.0

DISTORTION
ω=13.35°

-10   (%)   10.

SPHERICAL ABERRATION
D=4.0mm

-2.0   (m⁻¹)   2.0

ASTIGMATISM
ω=7.00°

-2.0   (m⁻¹)   2.0

DISTORTION
ω=7.00°

-10   (%)   10.

KEPLERIAN VARIABLE MAGNIFICATION FINDER

BACKGROUND OF THE INVENTION

1. Field of the Invention

This invention relates to a finder suitable for use in a lens shutter camera and the like in which a photographic lens system is provided which is independent of a finder lens system.

2. Description of Related Art

Keplerian finders are designed so that a field frame and additional marks are provided adjacent to the intermediate image plane of an objective system and can be observed through an ocular system. Thus, the boundary line of the frame is sharply viewed. Moreover, since a visual field itself can be clearly recognized with little flare, the view of the visual field is very fine. An entrance window, because its location is near an entrance pupil, can be designed to diminish in size, and compactness of the finder can be achieved, depending upon how each of prisms constituting an image erecting system is configured to bend an optical path. For these reasons, the Keplerian finders have been often used as finders for high-grade lens shutter cameras in particular. However, a drawback is that dust particles that adhere to the periphery of the intermediate image plane usually can be seen, great care must be exercised at the manufacturing stage of the finder to avoid this difficulty.

Such a Keplerian finder, compared with a conventional Albada finder, has the great advantage that the view of the visual field is favorable. On the other hand, it has the defect in that since the entire system of the finder includes an objective system, an image erecting system, and an ocular system, the overall length of the finder is greater when such a finder is mounted in a camera, the thickness of a camera body becomes greater. With a variable magnification finder in particular, a space sufficient for moving lenses is required to vary the magnification of the finder and the entire length of the objective system becomes larger. This is responsible for a further increase in the thickness of the camera body.

However, in view for the latest needs of the improvement of a variable magnification ratio and the compactness of the camera, it has become an important matter reduce the overall length of the finder. Furthermore, in consideration of the ease with which a photographer sees through the finder, not to speak of the view of the finder, the position and size of an exit pupil also become important. In particular, the size of the exit pupil, namely the so-called pupil diameter, is closely connected with likelihood of vignetting the visual field which is caused when the photographer's eye is moved up and down or from side to side. If the pupil diameter is relatively small, the positional relationship between the photographer and the camera body will be seriously prejudiced, thus making it very difficult to see through the finder. Consequently, the enlargement of the pupil diameter is also an important matter.

In the Keplerian finders, many objective systems which are constructed as zoom lens systems have been invented in the past, and zoom lens systems for varying the magnification of the finder are available in various types. In particular, an objective system composed of three lens units having negative, positive, and positive powers, respectively, is favorably corrected for aberrations and can be compactly designed. Thus, for such objective systems, there are numerous examples of prior art.

Keplerian variable magnification finders having the objective systems mentioned above are known which are disclosed, for example, in Japanese Patent Preliminary Publication Nos. Hei 1-131510, Hei 4-53914, Hei 4-219711, and Hei 6-51201. Any of these finders is such that the objective system is constructed with three zoom lens units with negative, positive, and positive powers so that a first lens unit is fixed and second and third lens units are moved to change the magnification and compensate for the positional shift of an image plane.

The finder disclosed in Hei 1-131510 mentioned above is constructed so that when the magnification is changed from a low magnification position to a high magnification position, the second lens unit of the objective system is moved toward an object and the third lens unit is moved toward an image. Hence, the second lens unit practically bears variable magnification behavior and the third lens unit mainly serves to compensate for the positional shift of the image plane. The prior art finders disclosed after this, however, are such that as the result that the back focal distance of the objective system is increased so that reflecting surfaces for forming an erect image can be placed in the objective system, the third lens unit gradually comes to bear the variable magnification behavior and can be moved together with the second lens unit toward the object. In the finder disclosed in Hei 6-51201 in particular, the third lens unit completely bears the variable magnification behavior.

On the other hand, a finder with the pupil of enlarged diameter is disclosed, for example, in Japanese Patent Preliminary Publication No. Hei 4-214517. This finder is such that the objective system is constructed with two zoom lens units having negative and positive powers, a first lens unit composed of two lenses and a second lens unit composed of three lenses, and the pupil diameter is 5 mm in the whole variable magnification range from the low magnification position to the high magnification position.

However, any of the finders set forth in Hei 1-131510, Hei 4-53914, Hei 4-219711, and Hei 6-51201, although low in the variable magnification ratio, has a relatively long entire length and thus is unsuitable for compactness of the camera. Moreover, since the pupil diameter is as small as 4 mm, it is hard to see through the finder. The finder set forth in Hei 4-214517 is such that the pupil diameter is as large as 5 mm, but lenses constituting the finder are numerous and heavy because they are made of glass. As such, this finder has a disadvantage of being high in cost. Additionally, the finder has a relatively long entire length, and thus is unsuitable for a compact camera.

SUMMARY OF THE INVENTION

It is, therefore, an object of the present invention to provide a Keplerian variable magnification finder which bears a high variable magnification ratio, is relatively small in overall length, and has high performance.

Another object of the present invention is to provide a Keplerian variable magnification finder which has a relatively large pupil diameter so that a photographer can easily see through the finder.

According to one aspect of the present invention, the Keplerian variable magnification finder includes, in order from the object side, an objective system having a positive refracting power as a whole, an image erecting system for erecting an intermediate image formed by the objective system, and an eyepiece system having a positive refracting power as a whole. The objective system is equipped with, in order from the object side, a first lens unit having a negative refracting power, a second lens unit having a positive refracting power, and a third lens unit having a positive refracting power so that when the magnification of the finder is changed, the second and third lens units can be moved along the optical axis. The objective system satisfies the following conditions at the same time:

$$0.1 < |f_1/(f_S \cdot Z)| < 0.4 \quad (1)$$

$$0.2 < f_3/(f_S \cdot Z) < 0.5 \quad (2)$$

where $f_1$ is the focal length of the first lens unit, $f_3$ is the focal length of the third lens unit, $f_S$ is the intermediate focal length of the objective system $(f_S = (f_W f_T)^{1/2}$ when focal lengths of the objective system at low and high magnification positions are represented by $f_W$ and $f_T$, respectively), and Z is a variable magnification ratio $(Z=f_T/f_W)$.

According to another aspect of the present invention, the Keplerian variable magnification finder includes, in order from the object side, an objective system having a positive refracting power as a whole, an image erecting system for erecting an intermediate image formed by the objective system, and an eyepiece system having a positive refracting power as a whole. The objective system is equipped with, in order from the object side, a first lens unit having a negative refracting power, a second lens unit having a positive refracting power, and a third lens unit having a positive refracting power so that when the magnification of the finder is changed, the second and third lens units can be moved along the optical axis. Each lens unit is composed of a single lens and the second or third lens unit is configured as a lens, both surfaces of which are aspherical.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
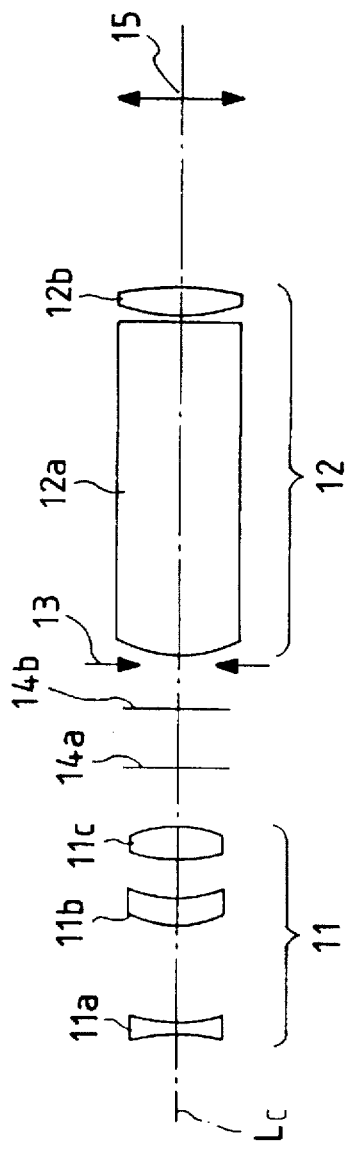
FIGS. 1A, 1B, and 1C are sectional views showing arrangements, developed along an optical axis, at low, moderate, and high magnification positions, respectively, of the optical system of a first embodiment of the Keplerian variable magnification finder according to the present invention.

Before undertaking the description of the embodiments, it will be expedient to explain the function of the Keplerian variable magnification finder according to the present invention.

In general, when a Keplerian variable magnification finder is designed, the image erecting system is configured to bend the optical path, and thus its thickness can be made small, to some extent, depending upon how the path is bent. With objective system, on the other hand, it is difficult to do so because when the magnification of the finder is changed, individual lens units constituting the objective system must be moved along the optical axis. Hence, the entire length of the objective system forms a chief factor in the determination of thickness of the camera. In order to obtain a camera of small thickness, it is indispensable for the finder design that the entire length of the objective system is be reduced.

Factors affecting the entire length of the objective system include (1) thicknesses of lenses of individual lens units constituting the objective system, (2) space required for moving the individual lens units, and (3) the back focal distance of the objective system. A distance from the last surface of the objective system to the intermediate image plane, namely the so-called back focal distance, always exists in an optical system, and the entire length of the objective system, including this distance, is in general determined. If, however, the back focal distance is made to be long to such an extent that the image erecting system can be disposed, and reflecting members, such as prisms and mirrors, are arranged in this space, the smallest possible thickness for the camera can be attained.

Thus, in the present invention, the above-mentioned arrangement is adopted to thereby limit the space required for moving individual lens units of the objective system when the magnification is changed, so that the design of the finder for a camera of small thickness is achieved. In the finder of the present invention, the back focal distance of the objective system is increased to some extent, and some of reflecting surfaces for erecting an image are placed in this space. In this way, by replacing the back focal distance of the objective system by the length of the image erecting system, the length of the finder can be diminished accordingly.

Eq. (1) previously described is provided for the purpose of properly holding the back focal distance. If the value of $|f_1/(f_S Z)|$ oversteps the upper limit of Eq. (1), the power of the first lens unit constituting the finder will be weakened and it becomes difficult to ensure a proper back focal distance. If, on the other hand, the value of $|f_1/(f_S Z)|$ is below the lower limit of Eq. (1), the power of the first lens unit will be strengthened and thus the back focal distance is secured without any problem, but correction for aberration becomes difficult. For this reason, it is necessary that additional lenses are placed in the objective system to correct for aberration. This situation is not favorable.

Further, in the Keplerian variable magnification finder of the present invention, the third lens unit of the objective system practically bears variable magnification behavior, and hence, in order to narrow the space required for moving individual lens units when the magnification is varied, it is required that the amount of movement of the third lens unit is decreased. A condition required for this is given by Eq. (2). If the value of $f_3/(f_S Z)$ exceeds the upper limit of Eq. (2), the power of the third lens unit will be lessened and the amount of movement of the third lens unit for varying the magnification will be increased. If, on the other hand, the value of $f_3/(f_S Z)$ is less than the lower limit of Eq. (2), the power of the third lens unit will be strengthened and the amount of movement of the third lens unit will be decreased, but correction for aberration becomes difficult. For this reason, it is necessary that additional lenses are placed in the objective system to correct for aberration. This situation is not favorable.

Still further, in the Keplerian variable magnification finder of the present invention, as will be described later, each lens unit included in the objective system is composed of a single lens so that the entire length of the finder is prevented from increasing. However, if Eqs. (1) and (2) are satisfied, the increase of the entire length of the finder can be kept to a minimum even though additional lenses are placed in order that aberration is more favorably corrected.

The finder of the present invention is such that an axial ray of light, after being made divergent by a strong negative power that the first lens unit possesses, is incident on the second and third lens units each having a positive power and is introduced through the image erecting system and the eyepiece system into a photographer's eye. Therefore, the axial ray has a maximum ray height in the second or third lens unit, where spherical aberration of undercorrection is produced. In the conventional finder, such spherical aberration has been corrected by a negative power the first lens unit possesses or by providing at least one surface of each lens unit with an aspherical surface. In this case, however, if the pupil diameter is enlarged to 5 mm as in the finder of the present invention, the spherical aberration will increase thus becoming difficult to correct. In particular, spherical aberration of undercorrection is yielded at the low magnification position, while spherical aberration of overcorrection is produced at the high magnification position. Thus, in order to correct such spherical aberrations, the finder of the present invention uses a lens whose surfaces are both configured to be aspherical in the second or third lens unit in which the axial ray has the maximum ray height. In this case, if an additional lens is placed, the spherical aberrations can be corrected even with a lens with one aspherical surface, or with a spherical lens only, but cost will increase and the entire length of the finder will be increase. The result is very unfavorable. Hence, in the present invention, the second or third lens unit is composed of a single lens, both surfaces of which are configured to be aspherical. It is desirable that this lens has such a shape that the power of the positive lens is weakened progressively in separating from the optical axis.

In accordance with the embodiments shown in the drawings, the present invention will be explained in detail below.

First Embodiment

Figure 1B:
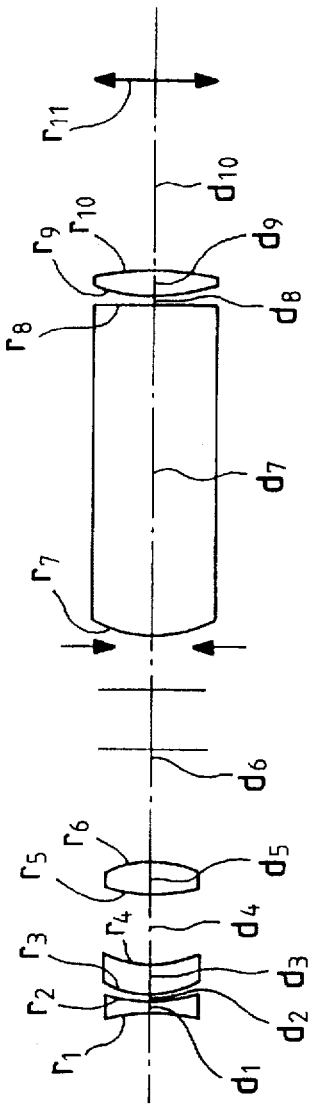
Figure 1C:
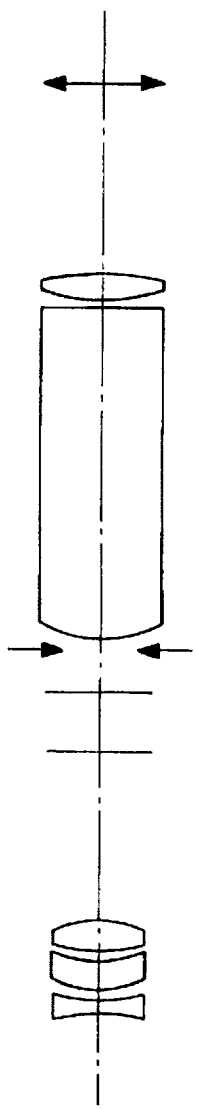
Figure 2A:
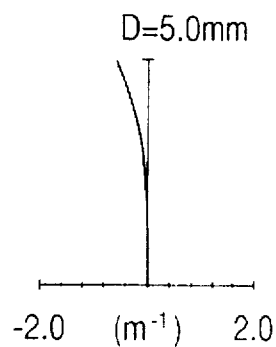
FIGS. 2A, 2B, and 2C are diagrams showing characteristics of spherical aberration, astigmatism, and distortion, respectively, at the low magnification position with an infinite object point of the optical system of the first embodiment.
Figure 2B:
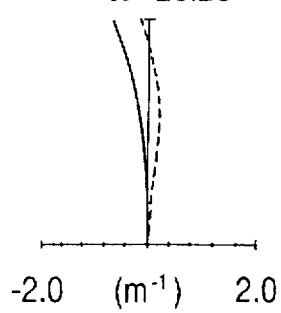
Figure 2C:
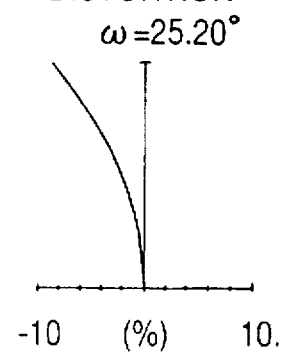
Figure 3A:
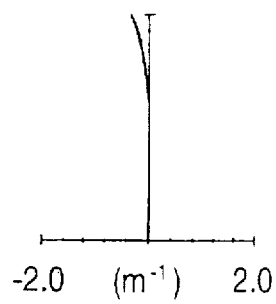
FIGS. 3A, 3B, and 3C are diagrams showing characteristics of spherical aberration, astigmatism, and distortion, respectively, at the moderate magnification position with the infinite object point of the optical system of the first embodiment.
Figure 3B:
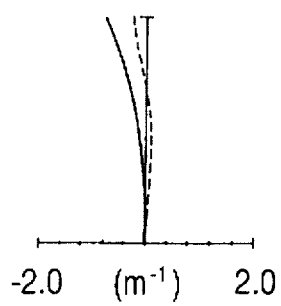
Figure 3C:
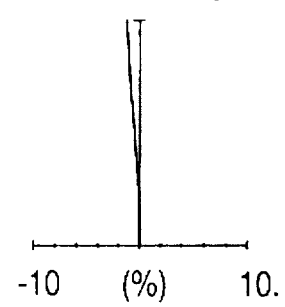
Figure 4A:
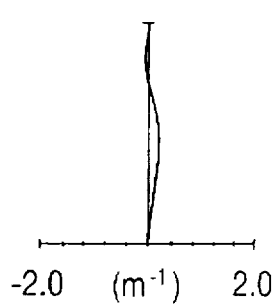
FIGS. 4A, 4B, and 4C are diagrams showing characteristics of spherical aberration, astigmatism, and distortion, respectively, at the high magnification position with the infinite object point of the optical system of the first embodiment.
Figure 4B:
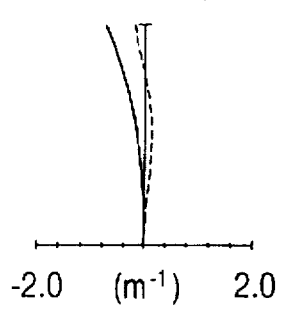
Figure 4C:
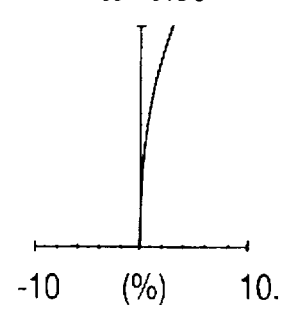

The finder of this embodiment, as shown in FIGS. 1A, 1B, and 1C, includes, in order from the object side, an objective system 11 composed of a first lens unit 11a with a negative refracting power, a second lens unit 11b with a positive refracting power, and a third lens unit 11c with a positive refracting power; and an eyepiece system 12 composed of a prism 12a as a reflecting member and an eyepiece 12b. A stop 13 is placed between the objective system 11 and the eyepiece system 12. An intermediate image plane produced by the objective system 11 is formed at the foremost surface of the prism 12a. In individual lens units constituting the objective system 11, the first lens unit 11a is fixed and the second and third lens units 11b and 11c are moved along an optical axis Lc to vary the magnification of the finder. Further, a first reflecting surface 14a and a second reflecting surface 14b are arranged between the objective system 11 and the stop 13. The prism 12a has two reflecting surfaces. The first and second reflecting surfaces 14a and 14b and the prism 12a constitute an image erecting system. The first, second, and third lens units 11a, 11b, and 11c and the eyepiece 12b are each constructed with a single lens. Reference numeral 15 represents an eyepoint.

In the first embodiment, each of the first and second reflecting surfaces 14a and 14b is composed of a roof mirror, and the prism 12a is constructed with a pentagonal prism.

The numerical data of optical members, such as lenses, constituting the Keplerian variable magnification finder according to the first embodiment is shown below.

| | |
|---|---|
| Finder magnification | 0.40(low) ~ 0.63(moderate) ~ 1.00(high) |
| Field angle (2ω) | 50.4(low) ~ 30.8(moderate) ~ 19.0°(high) |
| Pupil diameter Z | 5 mm |
| focal length | $f_1 = -12.163$   $f_3 = 11.416$ |
| | $f_w = 8.404$   $f_s = 13.284$   $f_T = 20.998$ |
| variable magnification ratio D | 2.499 |

$r_1 = -18.510$
  $d_1 = 1.00$   $n_1 = 1.58423$   $v_1 = 30.49$
$r_2 = 11.763$
  $d_2 = 8.433$ (low),
      $0.665$ (moderate),
      $0.918$ (high)
$r_3 = 7.141$ (aspherical)
  $d_3 = 2.70$   $n_3 = 1.49241$   $v_3 = 57.66$
$r_4 = 10.084$ (aspherical)
  $d_4 = 3.576$ (low),
      $6.312$ (moderate),
      $0.800$ (high)
$r_5 = 14.833$ (aspherical)
  $d_5 = 3.00$   $n_5 = 1.49241$   $v_5 = 57.66$
$r_6 = -8.448$ (aspherical)
  $d_6 = 0.930$ (low),
      $5.962$ (moderate),
      $11.222$ (high)
$r_7 = 11.083$
  $d_7 = 43.50$   $n_7 = 1.52540$   $v_7 = 56.25$
$r_8 = \infty$
  $d_8 = 1.00$
$r_9 = 17.558$
  $d_9 = 2.30$   $n_9 = 1.49241$   $v_9 = 57.66$
$r_{10} = -24.070$ (aspherical)
  $d_{10} = 17.00$
$r_{11}$ (eyepoint)
Conic constants and aspherical coefficients Third surface $\kappa = 0$
$A_4 = -9.1047 \times 10^{-5}$, $A_6 = -3.7323 \times 10^{-5}$,
$A_8 = -4.3583 \times 10^{-7}$, $A_{10} = -1.6258 \times 10^{-8}$
Fourth surface $\kappa = -0.1710$
$A_4 = 2.5258 \times 10^{-4}$, $A_6 = -5.7016 \times 10^{-5}$,
$A_8 = 1.0263 \times 10^{-7}$, $A_{10} = 1.0868 \times 10^{-7}$
Fifth surface $\kappa = 0.0922$
$A_4 = -7.5195 \times 10^{-4}$, $A_6 = 8.4373 \times 10^{-6}$,
$A_8 = -3.2078 \times 10^{-6}$, $A_{10} = 3.5716 \times 10^{-7}$
Sixth surface $\kappa = 0.1207$
$A_4 = -2.2063 \times 10^{-4}$, $A_6 = 3.0166 \times 10^{-6}$,
$A_8 = -7.7090 \times 10^{-7}$, $A_{10} = 1.2903 \times 10^{-7}$
Tenth surface $\kappa = 0.1216$
$A_4 = 1.0526 \times 10^{-4}$, $A_6 = -3.1631 \times 10^{-6}$,
$A_8 = 1.1965 \times 10^{-7}$, $A_{10} = -1.7720 \times 10^{-9}$ The values of Eqs. (1) and (2) in the Keplerian variable magnification finder of the first embodiment are as follows:

$|f_1|/(f_s Z)=0.366$ $f_3/(f_s Z)=0.344$

FIGS. 2A–2C, 3A–3C, and 4A–4C are aberration curve diagrams of the optical system in the first embodiment.

Second Embodiment

Figure 5A:
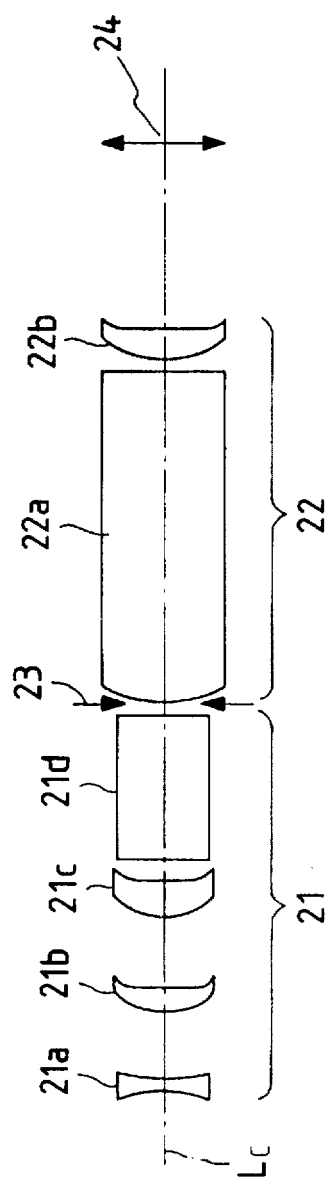
FIGS. 5A, 5B, and 5C are sectional views showing arrangements, developed along an optical axis, at low, moderate, and high magnification positions, respectively, of the optical system of a second embodiment of the Keplerian variable magnification finder according to the present invention.
Figure 5B:
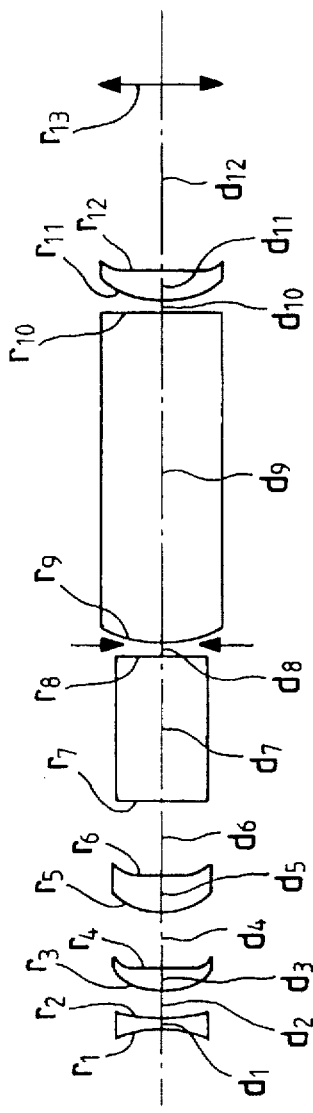
Figure 5C:
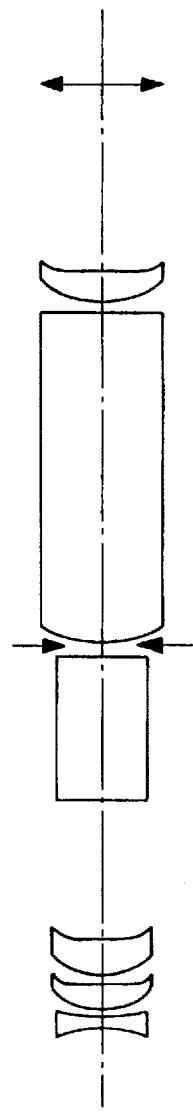
Figure 6A:
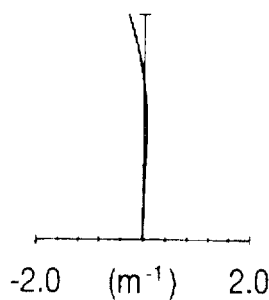
FIGS. 6A, 6B, and 6C are diagrams showing characteristics of spherical aberration, astigmatism, and distortion, respectively, at the low magnification position with an infinite object point of the optical system of the second embodiment.
Figure 6B:
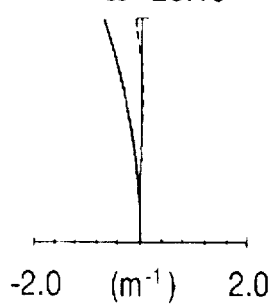
Figure 6C:
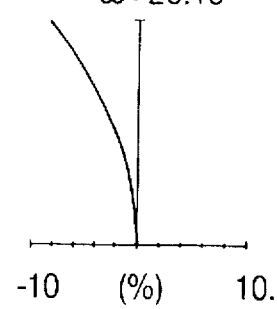
Figure 7A:
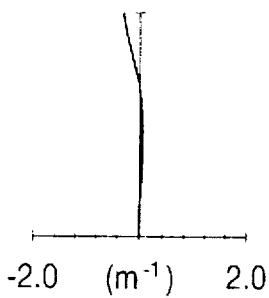
FIGS. 7A, 7B, and 7C are diagrams showing characteristics of spherical aberration, astigmatism, and distortion, respectively, at the moderate magnification position with the infinite object point of the optical system of the second embodiment.
Figure 7B:
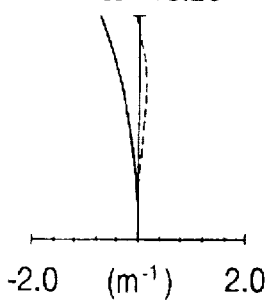
Figure 7C:
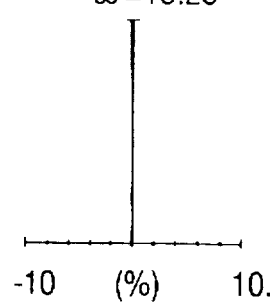
Figure 8A:
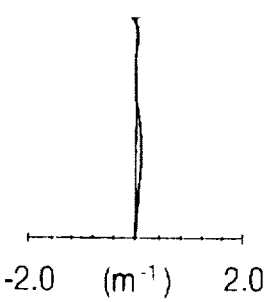
FIGS. 8A, 8B, and 8C are diagrams showing characteristics of spherical aberration, astigmatism, and distortion, respectively, at the high magnification position with the infinite object point of the optical system of the second embodiment.
Figure 8B:
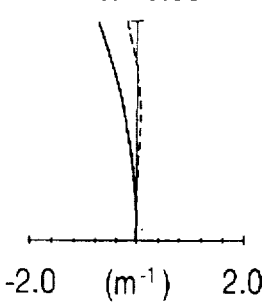
Figure 8C:
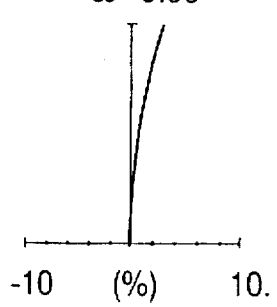

The finder of this embodiment, as shown in FIGS. 5A, 5B, and 5C, includes, in order from the object side, an objective system 21 composed of a first lens unit 21a with a negative refracting power, a second lens unit 21b with a positive refracting power, a third lens unit 21c with a positive refracting power, and a prism 21d as a reflecting member; and an eyepiece system 22 composed of a prism 22a as a reflecting member and an eyepiece 22b. A stop 23 is placed between the objective system 21 and the eyepiece system 22. An intermediate image plane produced by the objective system 21 is formed at the foremost surface of the prism 22a. In individual lens units constituting the objective system 21, the first lens unit 21a is fixed and the second and third lens units 21b and 21c are moved along the optical axis Lc so that the magnification of the finder is changed. The prisms 21d and 22a each have two reflecting surfaces and constitute an image erecting system. The first, second, and third lens units 21a, 21b, and 21c and the eyepiece 22b are each constructed with a single lens. Reference numeral 24 represents an eyepoint.

Since, in the second embodiment, the prism 21d is composed of a roof prism and the prism 22a is constructed with a pentagonal prism, the height of the camera body can be kept to a minimum when the finder is incorporated in the camera.

The numerical data of optical members, such as lenses, constituting the Keplerian variable magnification finder according to the second embodiment is shown below.

| | |
|---|---|
| Finder magnification | 0.40(low) ~ 0.63(moderate) ~ 1.00(high) |
| Field angle (2ω) | 50.3(low) ~ 30.5(moderate) ~ 19.0°(high) |
| Pupil diameter Z | 5 mm |
| focal length | $f_1 = -9.375$   $f_3 = 15.382$ |
| | $f_w = 8.402$   $f_s = 13.283$   $f_T = 20.999$ |
| variable magnification ratio D | 2.499 |

$r_1 = -9.345$ (aspherical)
  $d_1 = 1.00$   $n_1 = 1.58423$   $v_1 = 30.49$
$r_2 = 13.757$
  $d_2 = 6.436$ (low),
      $2.508$ (moderate),
      $0.800$ (high)
$r_3 = 7.427$ (aspherical)
  $d_3 = 2.00$   $n_3 = 1.49241$   $v_3 = 57.66$
$r_4 = -197.866$ (aspherical)
  $d_4 = 6.147$ (low),
      $5.102$ (moderate),
      $0.800$ (high)
$r_5 = 6.724$ (aspherical)
  $d_5 = 3.30$   $n_5 = 1.49241$   $v_5 = 57.66$
$r_6 = 50.190$ (aspherical)
  $d_6 = 1.622$ (low),
      $6.595$ (moderate)
      $12.605$ (high)
$r_7 = \infty$
  $d_7 = 13.00$   $n_7 = 1.49241$   $v_7 = 57.66$
$r_8 = \infty$
  $d_8 = 1.00$
$r_9 = 10.897$
  $d_9 = 29.50$   $n_9 = 1.49241$   $v_9 = 57.66$
$r_{10} = \infty$
  $d_{10} = 1.00$
$r_{11} = 11.953$ (aspherical)
  $d_{11} = 2.50$   $n_{11} = 1.49241$   $v_{11} = 57.66$
$r_{12} = -71.502$ (aspherical)
  $d_{12} = 17.00$
$r_{13}$ (eyepoint)
Conic constants and aspherical coefficients First surface $\kappa = -0.5786$
$A_4 = 2.7980 \times 10^{-4}$, $A_6 = -8.2283 \times 10^{-7}$,
Third surface $\kappa = 0$
$A_4 = 6.3689 \times 10^{-4}$, $A_6 = 2.8528 \times 10^{-5}$,
$A_8 = 2.0450 \times 10^{-6}$
Fourth surface -continued $\kappa = -0.4915$
$A_4 = 1.2989 \times 10^{-3}$, $A_6 = 3.4004 \times 10^{-5}$,
$A_8 = 3.3236 \times 10^{-6}$
Fifth surface $\kappa = 0$
$A_4 = 4.6744 \times 10^{-4}$, $A_6 = 4.1905 \times 10^{-5}$,
$A_8 = -1.3619 \times 10^{-6}$
Sixth surface $\kappa = 0.7518$
$A_4 = 1.3670 \times 10^{-3}$, $A_6 = 7.2229 \times 10^{-5}$,
$A_8 = 6.0766 \times 10^{-7}$
Eleventh surface $\kappa = -0.0690$
$A_4 = 4.6692 \times 10^{-4}$, $A_6 = -1.3707 \times 10^{-5}$,
$A_8 = 8.7060 \times 10^{-7}$
Twelfth surface $\kappa = 0.4493$
$A_4 = 6.4654 \times 10^{-4}$, $A_6 = -1.9483 \times 10^{-5}$,
$A_8 = 1.3060 \times 10^{-6}$ The values of Eqs. (1) and (2) in the Keplerian variable magnification finder of the second embodiment are as follows:

$|f_1|/(f_s \cdot Z)|=0.282$ $f_3/(f_s \cdot Z)=0.463$

FIGS. 6A–6C, 7A–7C, and 8A–8C are aberration curve diagrams of the optical system in the second embodiment.

Third Embodiment

Figure 9A:
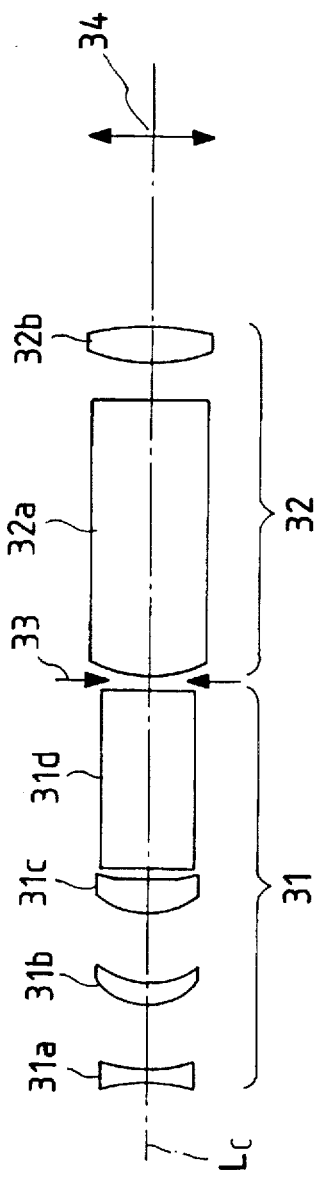
FIGS. 9A, 9B, and 9C are sectional views showing arrangements, developed along an optical axis, at low, moderate, and high magnification positions, respectively, of the optical system of a third embodiment of the Keplerian variable magnification finder according to the present invention.
Figure 9B:
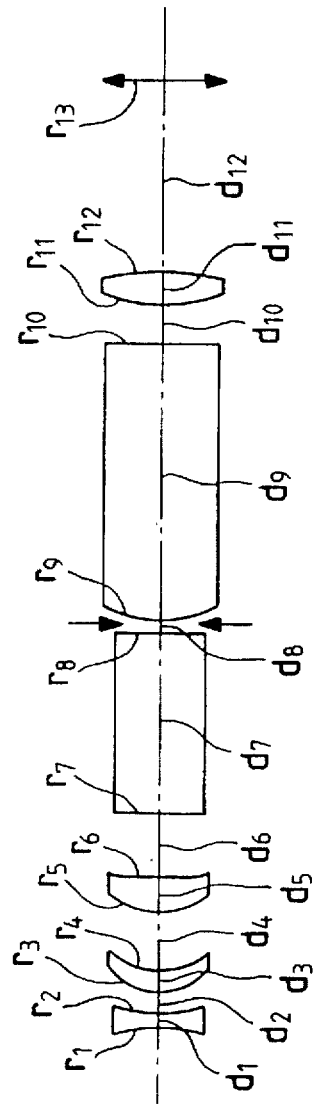
Figure 9C:
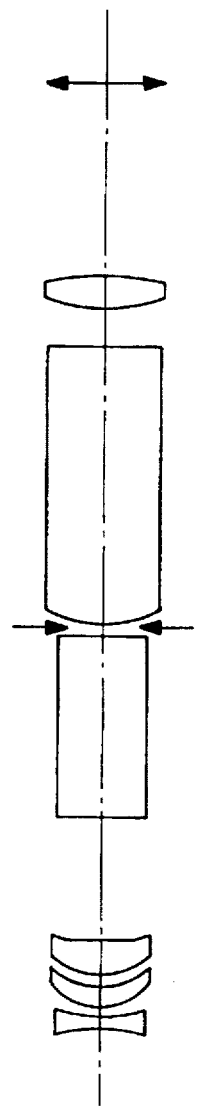
Figure 10A:
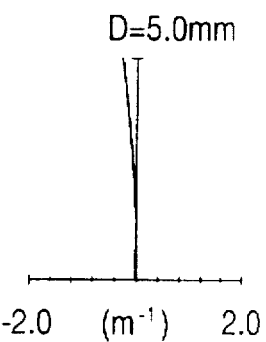
FIGS. 10A, 10B, and 10C are diagrams showing characteristics of spherical aberration, astigmatism, and distortion, respectively, at the low magnification position with an infinite object point of the optical system of the third embodiment.
Figure 10B:
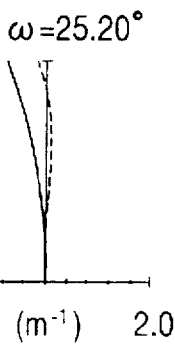
Figure 10C:
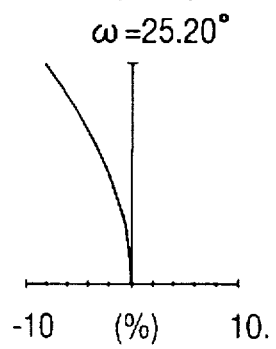
Figure 11A:
FIGS. 11A, 11B, and 11C are diagrams showing characteristics of spherical aberration, astigmatism, and distortion, respectively, at the moderate magnification position with the infinite object point of the optical system of the third embodiment.
Figure 11B:
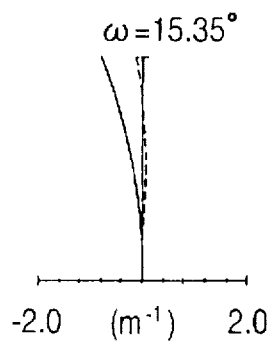
Figure 11C:
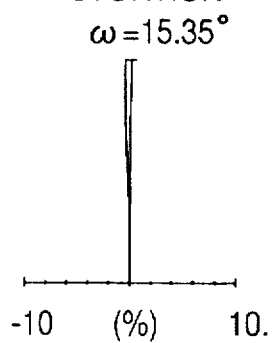
Figure 12A:
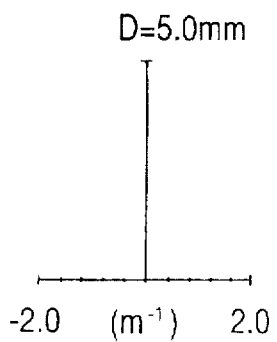
FIGS. 12A, 12B, and 12C are diagrams showing characteristics of spherical aberration, astigmatism, and distortion, respectively, at the high magnification position with the infinite object point of the optical system of the third embodiment.
Figure 12B:
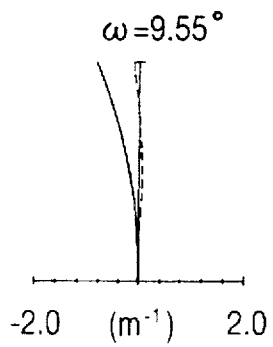
Figure 12C:
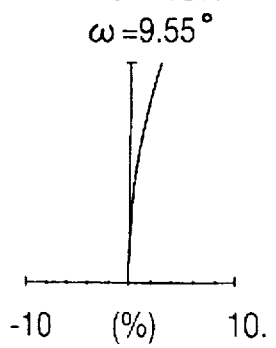

The finder of this embodiment, as shown in FIGS. 9A, 9B, and 9C, includes, in order from the object side, an objective system 31 composed of a first lens unit 31a with a negative refracting power, a second lens unit 31b with a positive refracting power, a third lens unit 31c with a positive refracting power, and a prism 31d as a reflecting member; and an eyepiece system 32 composed of a prism 32a as a reflecting member and an eyepiece 32b. A stop 33 is placed between the objective system 31 and the eyepiece system 32. An intermediate image plane produced by the objective system 31 is formed at the foremost surface of the prism 32a. In individual lens units constituting the objective system 31, the first lens unit 31a is fixed and the second and third lens units 31b and 31c are moved along the optical axis Lc so that the magnification is changed. The prisms 31d and 32a each have two reflecting surfaces and constitute an image erecting system. The first, second, and third lens units 31a, 31b, and 31c and the eyepiece 32b are each constructed with a single lens. Reference numeral 34 represents an eyepoint. In the third embodiment, each of the prisms 31d and 32a is composed of a Porro prism.

The numerical data of optical members, such as lenses, constituting the Keplerian variable magnification finder according to the third embodiment is shown below.

| Finder magnification | 0.40(low) ~ 0.63(moderate) ~ 1.00(high) |
|---|---|
| Field angle (2ω) | 50.4(low) ~ 30.7(moderate) ~ 19.1°(high) |
| Pupil diameter Z | 5 mm |
| focal length | $f_1 = -9.608$   $f_3 = 12.406$ |
|  | $f_w = 8.401$   $f_s = 13.284$   $f_T = 21.004$ |
| variable magnification ratio D | 2.500 |

-continued $r_1 = -12.184$ (aspherical)
  $d_1 = 1.00$    $n_1 = 1.58423$    $\nu_1 = 30.49$
$r_2 = 10.723$ (aspherical)
  $d_2 = 5.794$ (low),
      1.771 (moderate),
      0.800 (high)
$r_3 = 5.859$ (aspherical)
  $d_3 = 2.00$    $n_3 = 1.49241$    $\nu_3 = 57.66$
$r_4 = 14.897$ (aspherical)
  $d_4 = 6.239$ (low),
      5.305 (moderate),
      0.800 (high)
$r_5 = 7.107$ (aspherical)
  $d_5 = 3.30$    $n_5 = 1.49241$    $\nu_5 = 57.66$
$r_6 = -36.842$ (aspherical)
  $d_6 = 0.800$ (low),
      5.756 (moderate),
      11.232 (high)
$r_7 = \infty$
  $d_7 = 16.00$    $n_7 = 1.49241$    $\nu_7 = 57.66$
$r_8 = \infty$
  $d_8 = 1.00$
$r_9 = 10.635$
  $d_9 = 25.00$    $n_9 = 1.49241$    $\nu_9 = 57.66$
$r_{10} = \infty$
  $d_{10} = 3.50$
$r_{11} = 16.187$
  $d_{11} = 2.90$    $n_{11} = 1.49241$    $\nu_{11} = 57.66$
$r_{12} = -26.932$ (aspherical)
  $d_{12} = 17.00$
$r_{13}$ (eyepoint)
Conic constants and aspherical coefficients Second surface $\kappa = 0$
$A_4 = -2.8002 \times 10^{-4}$, $A_6 = -1.6463 \times 10^5$,
$A_8 = -5.3504 \times 10^{-7}$
Third surface $\kappa = 0$
$A_4 = 5.5947 \times 10^{-4}$, $A_6 = -1.2010 \times 10^{-5}$,
$A_8 = 1.0077 \times 10^{-6}$
Fourth surface $\kappa = 0.0967$
$A_4 = 1.6063 \times 10^{-3}$, $A_6 = 2.1951 \times 10^{-5}$,
$A_8 = 1.5483 \times 10^{-6}$
Fifth surface $\kappa = 0$
$A_4 = 3.4414 \times 10^{-4}$, $A_6 = 2.7247 \times 10^{-5}$,
$A_8 = -5.4641 \times 10^{-7}$
Sixth surface $\kappa = 0.6120$
$A_4 = 1.0511 \times 10^{-3}$, $A_6 = 5.4572 \times 10^{-5}$,
Twelfth surface $\kappa = -0.2299$
$A_4 = 8.5111 \times 10^{-5}$, $A_6 = -1.2033 \times 10^{-6}$,
$A_8 = 4.4531 \times 10^{-8}$, $A_{10} = -5.4536 \times 10^{-10}$ The values of Eqs. (1) and (2) in the Keplerian variable magnification finder of the third embodiment are as follows:

$|f_1|/(f_s \cdot Z)|=0.289$ $f_3/(f_s \cdot Z)=0.374$

FIGS. 10A–10C, 11A–11C, and 12A–12C are aberration curve diagrams of the optical system in the third embodiment.

Fourth Embodiment

Figure 13A:
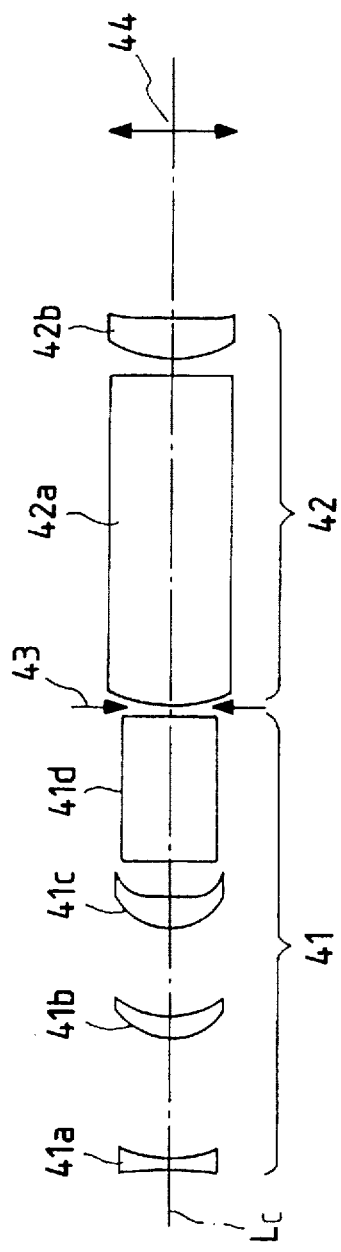
FIGS. 13A, 13B, and 13C are sectional views showing arrangements, developed along an optical axis, at low, moderate, and high magnification positions, respectively, of the optical system of a fourth embodiment of the Keplerian variable magnification finder according to the present invention.
Figure 13B:
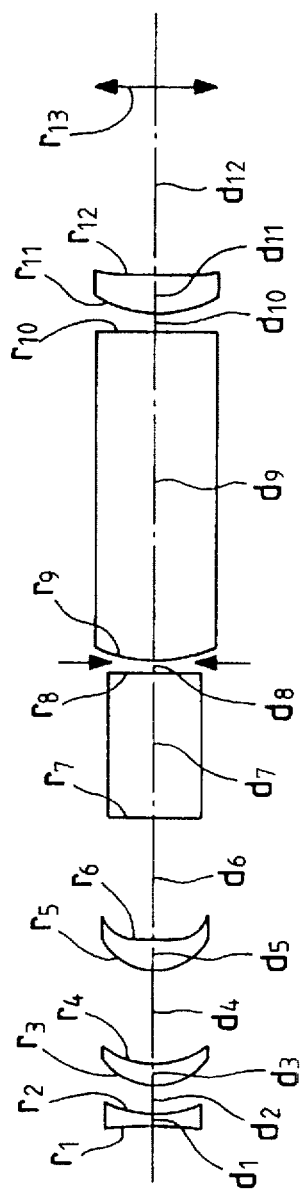
Figure 13C:
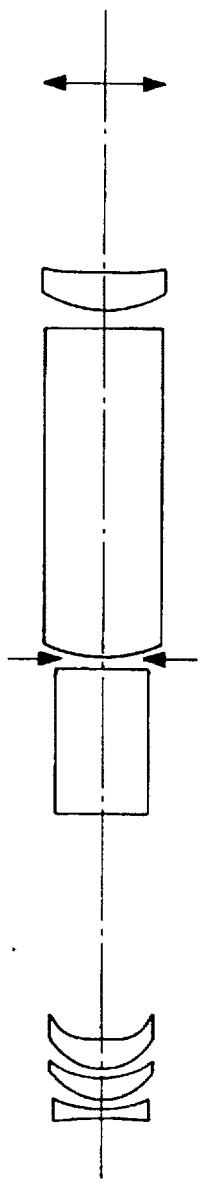
Figure 14A:
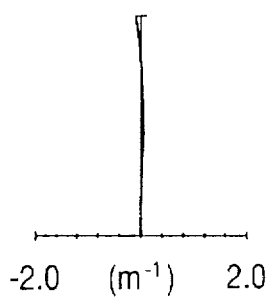
FIGS. 14A, 14B, and 14C are diagrams showing characteristics of spherical aberration, astigmatism, and distortion, respectively, at the low magnification position with an infinite object point of the optical system of the fourth embodiment.
Figure 14B:
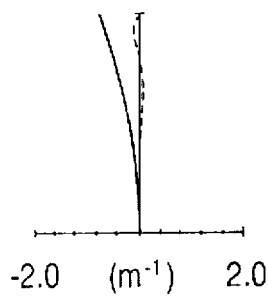
Figure 14C:
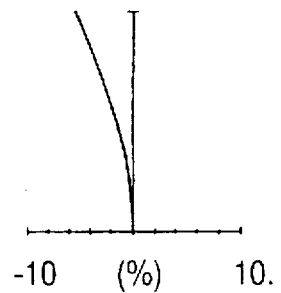
Figure 15A:
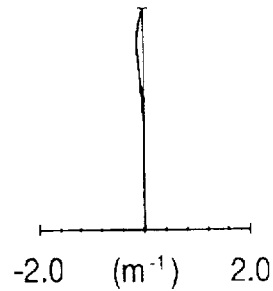
FIGS. 15A, 15B, and 15C are diagrams showing characteristics of spherical aberration, astigmatism, and distortion, respectively, at the moderate magnification position with the infinite object point of the optical system of the fourth embodiment.
Figure 15B:
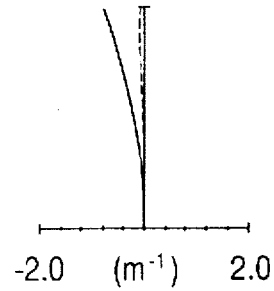
Figure 15C:
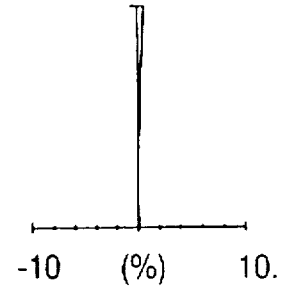
Figure 16A:
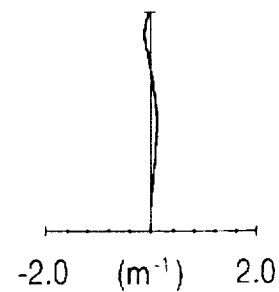
FIGS. 16A, 16B, and 16C are diagrams showing characteristics of spherical aberration, astigmatism, and distortion, respectively, at the high magnification position with the infinite object point of the optical system of the fourth embodiment.
Figure 16B:
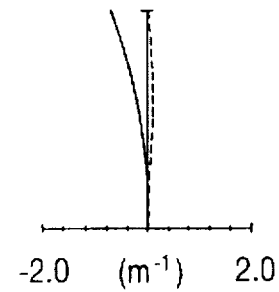
Figure 16C:
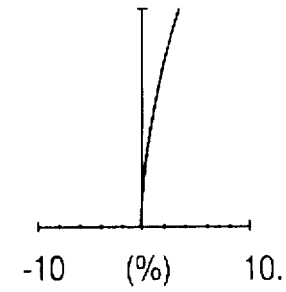

The finder of this embodiment, as shown in FIGS. 13A, 13B, and 13C, includes, in order from the object side, an objective system 41 composed of a first lens unit 41a with a negative refracting power, a second lens unit 41b with a positive refracting power, a third lens unit 41c with a positive refracting power, and a prism 41d as a reflecting member; and an eyepiece system 42 composed of a prism 42a as a reflecting member and an eyepiece 42b. A stop 43 is placed between the objective system 41 and the eyepiece system 42. An intermediate image plane produced by the objective system 41 is formed at the foremost surface of the prism 42a. In individual lens units constituting the objective system 41, the first lens unit 41a is fixed and the second and third lens units 41b and 41c are moved along the optical axis Lc so that the magnification is changed. The prisms 41d and 42a each have two reflecting surfaces and constitute an image erecting system. The first, second, and third lens units 41a, 41b, and 41c and the eyepiece 42b are each constructed with a single lens. Reference numeral 44 represents an eyepoint.

Since, in the fourth embodiment, the prism 41d is composed of a roof prism and the prism 42a is constructed with a pentagonal prism, the height of the camera body can be kept to a minimum when the finder is incorporated in the camera.

The numerical data of optical members, such as lenses, constituting the Keplerian variable magnification finder according to the fourth embodiment is shown below.

| | |
|---|---|
| Finder magnification | 0.40(low) ~ 0.75(moderate) ~ 1.40(high) |
| Field angle (2ω) | 50.4(low) ~ 26.7(moderate) ~ 14.0°(high) |
| Pupil diameter Z | 4 mm |
| focal length | $f_1 = -11.948$   $f_3 = 15.231$ |
| | $f_w = 8.400$   $f_s = 15.714$   $f_T = 29.398$ |
| variable magnification ratio D | 3.500 |

$r_1 = -95.750$ (aspherical)
  $d_1 = 1.00$   $n_1 = 1.58423$   $v_1 = 30.49$
$r_2 = 7.558$ (aspherical)
  $d_2 = 10.638$ (low),
     2.517 (moderate),
     0.800 (high)
$r_3 = 5.586$ (aspherical)
  $d_3 = 2.00$   $n_3 = 1.49241$   $v_3 = 57.66$
$r_4 = 11.055$ (aspherical)
  $d_4 = 7.741$ (low),
     8.347 (moderate),
     0.800 (high)
$r_5 = 6.322$ (aspherical)
  $d_5 = 2.60$   $n_5 = 1.49241$   $v_5 = 57.66$
$r_6 = 34.797$ (aspherical)
  $d_6 = 3.145$ (low),
     10.659 (moderate),
     19.924 (high)
$r_7 = \infty$
  $d_7 = 13.00$   $n_7 = 1.52540$   $v_7 = 56.25$
$r_8 = \infty$
  $d_8 = 1.00$
$r_9 = 12.547$
  $d_9 = 29.50$   $n_9 = 1.52540$   $v_9 = 56.25$
$r_{10} = \infty$
  $d_{10} = 1.45$
$r_{11} = 11.250$ (aspherical)
  $d_{11} = 3.50$   $n_{11} = 1.49241$   $v_{11} = 57.66$
$r_{12} = -114.826$ (aspherical)
  $d_{12} = 17.00$
$r_{13}$ (eyepoint)
Conic constants and aspherical coefficients First surface $\kappa = 1.6248$
$A_4 = -9.8688 \times 10^{-4}$, $A_6 = 5.7129 \times 10^{-5}$,
$A_8 = -1.6783 \times 10^{-6}$
Second surface $\kappa = 0$
$A_4 = -1.3517 \times 10^{-3}$, $A_6 = 6.8553 \times 10^{-5}$, -continued $A_8 = -3.0827 \times 10^{-6}$
Third surface $\kappa = -0.1699$
$A_4 = 5.1147 \times 10^{-4}$, $A_6 = -1.5145 \times 10^{-5}$,
$A_8 = 8.0498 \times 10^{-7}$
Fourth surface $\kappa = 0.1162$
$A_4 = 1.3422 \times 10^{-3}$
Fifth surface $\kappa = 0$
$A_4 = 6.6135 \times 10^{-4}$, $A_6 = 7.7930 \times 10^{-5}$,
$A_8 = -2.3319 \times 10^{-6}$
Sixth surface $\kappa = 5.5487$
$A_4 = 1.5478 \times 10^{-3}$, $A_6 = 1.3386 \times 10^{-4}$,
$A_8 = 7.8036 \times 10^{-7}$
Eleventh surface $\kappa = 0$
$A_4 = 3.7484 \times 10^{-4}$, $A_6 = -8.2819 \times 10^{-6}$,
$A_8 = 3.7655 \times 10^{-7}$
Twelfth surface $\kappa = 1.3517$
$A_4 = 6.1859 \times 10^{-4}$, $A_6 = -1.4918 \times 10^{-5}$,
$A_8 = 7.4170 \times 10^{-7}$ The values of Eqs. (1) and (2) in the Keplerian variable magnification finder of the fourth embodiment are as follows:

$|f_1/(f_s Z)|=0.217$ $f_3/(f_s Z)=0.277$

FIGS. 14A–14C, 15A–15C, and 16A–16C are aberration curve diagrams of the optical system in the fourth embodiment.

Also, although all optical members constituting the finder of each embodiment mentioned above are constructed of plastic, it is more desirable to use low hygroscopic materials which are not affected by humidity in the atmosphere. Further, each of the first to third lens units of the objective system in the finder of each embodiment is composed of a single lens, but even when this single lens is constructed with a cemented lens, the same effect can be secured.

In the numerical data of each embodiment, $r_1, r_2, \ldots$ represent radii of curvature of individual lenses or prism surfaces; $d_1, d_2, \ldots$ represent thicknesses of individual lenses or prisms, or spaces therebetween; $n_1, n_2, \ldots$ represent refractive indices of individual lenses; and $v_1, v_2, \ldots$ represent Abbe's numbers of individual lenses. Also, when Z is taken as the coordinates in the direction of the optical axis, Y as the coordinates in the direction normal to the optical axis, $\kappa$ as the conic constant, and $A_4$, $A_6$, $A_8$, and $A_{10}$ as aspherical coefficients, the configurations of aspherical surfaces in each embodiment are expressed by the following equation:

$$Z = \frac{Y^2/r}{1+\sqrt{1-(1+\kappa)(Y/r)^2}} + A_4 Y^4 + A_6 Y^6 + A_8 Y^8 + A_{10} Y^{10}$$

What is claimed is:

1. A Keplerian variable magnification finder comprising, in order from an object side:

an objective system having a positive refracting power as a whole;

an image erecting system for erecting an intermediate image formed by said objective system; and an eyepiece system having a positive refracting power as a whole, said objective system including, in order from the object side:
- a first lens unit having a negative refracting power;
- a second lens unit having a positive refracting power; and
- a third lens unit having a positive refracting power, said second lens unit and said third lens unit being movable along an optical axis when magnification is changed, and said objective system satisfying the following conditions at the same time:

$0.1 < |f_1/(f_S \cdot Z)| < 0.4$ $0.2 < f_3/(f_S \cdot Z) < 0.5$ where $f_1$ is a focal length of said first lens unit, $f_3$ is a focal length of said third lens unit, $f_S$ is an intermediate focal length of said objective system, where $f_S = (f_W f_T)^{1/2}$ when focal lengths of said objective system at low and high magnification positions are represented by $f_W$ and $f_T$, respectively, and Z is a variable magnification ratio, where $Z = f_T/f_W$.

2. A Keplerian variable magnification finder according to claim 1, wherein said first lens unit is fixed when magnification is changed.

3. A Keplerian variable magnification finder comprising, in order from an object side:

an objective system having a positive refracting power as a whole;

an image erecting system for erecting an intermediate image formed by said objective system; and an eyepiece system having a positive refracting power as a whole;

said objective system including, in order form an object side:
- a first lens unit having a negative refracting power;
- a second lens unit having a positive refracting power; and
- a third lens unit having a positive refracting power, said second lens unit and said third lens unit being movable along an optical axis when magnification is changed, each of said first lens unit, said second lens unit, and said third lens unit being constructed with a single lens, and both surfaces of the single lens of said second lens unit being configured to be aspherical, wherein the following condition is satisfied:

$0.1 < |f_1/(f_S \cdot Z)| < 0.4$ wherein $f_1$ is a focal length of said first lens unit, $f_S$ is an intermediate focal length of said objective system, where $f_S = (f_W f_T)^{1/2}$ when focal lengths of said objective system at low and high magnification positions are represented by $f_W$ and $f_T$, respectively, and Z is a variable magnification ratio, where $Z = f_T/f_W$.

4. A Keplerian variable magnification finder according to claim 3, wherein both surfaces of the single lens of said first lens unit are configured to be aspherical.

5. A Keplerian variable magnification finder according to claim 3, wherein both surfaces of the single lens of said third lens unit are configured to be aspherical.

6. A Keplerian variable magnification finder comprising, in order from an object side:

an objective system having a positive refracting power as a whole;

an image erecting system for erecting an intermediate image formed by said objective system; and an eyepiece system having a positive refracting power as a whole, said objective system including, in order from an object side:
- a first lens unit having a negative refracting power;
- a second lens unit having a positive refracting power; and
- a third lens unit having a positive refracting power, said second lens unit and said third lens unit being movable along an optical axis when magnification is changed, each of said first lens unit, said second lens unit, and said third lens unit being constructed with a single lens, and both surfaces of the single lens of said third lens unit being configured to be aspherical, wherein the following condition is satisfied:

$0.1 < |f_1/(f_S \cdot Z)| < 0.4$ wherein $f_1$ is a focal length of said first lens unit, $f_S$ is an intermediate focal length of said objective system, where $f_S = (f_W f_T)^{1/2}$ when focal lengths of said objective system at low and high magnification positions are represented by $f_W$ and $f_T$, respectively, and Z is a variable magnification ratio, where $Z = f_T/f_W$.

7. A Keplerian variable magnification finder comprising, in order from an object side:

an objective system having a positive refracting power as a whole;

an image erecting system for erecting an intermediate image formed by said objective system; and an eyepiece system having a positive refracting power as a whole;

said objective system including, in order form an object side:
- a first lens unit having a negative refracting power;
- a second lens unit having a positive refracting power; and
- a third lens unit having a positive refracting power, said second lens unit and said third lens unit being movable along an optical axis when magnification is changed, each of said first lens unit, said second lens unit, and said third lens unit being constructed with a single lens, and both surfaces of the single lens of said second lens unit being configured to be aspherical, wherein the following condition is satisfied:

$0.2 < f_3/(f_S \cdot Z) < 0.5$ where $f_3$ is a focal length of said third lens unit, $f_S$ is an intermediate focal length of said objective system, where $f_S = (f_W f_T)^{1/2}$ when focal lengths of said objective system at low and high magnification positions are represented by $f_W$ and $f_T$, respectively, and Z is a variable magnification ratio, where $Z = f_T/f_W$.

8. A Keplerian variable magnification finder according to claim 7 wherein both surfaces of the single lens of said first lens unit are configured to be aspherical.

9. A Keplerian variable magnification finder according to claim 7, wherein respective both surfaces of single lenses of said second lens unit and said third lens unit are configured to be aspherical.

10. A Keplerian variable magnification finder comprising, in order from an object side:

an objective system having a positive refracting power as a whole;

an image erecting system for erecting an intermediate image formed by said objective system; and an eyepiece system having a positive refracting power as a whole, said objective system including, in order from an object side:

a first lens unit having a negative refracting power;

a second lens unit having a positive refracting power; and a third lens unit having a positive refracting power, said second lens unit and said third lens unit being movable along an optical axis when magnification is changed, each of said first lens unit, said second lens unit, and said third lens unit being constructed with a single lens, and both surfaces of the single lens of said third lens unit being configured to be aspherical, wherein the following condition is satisfied:

$$0.2 < f_3/(f_S Z) < 0.5$$

where $f_3$ is a focal length of said third lens unit, $f_S$ is an intermediate focal length of said objective system, where $f_S=(f_W f_T)^{1/2}$ when focal lengths of said objective system at low and high magnification positions are represented by $f_W$ and $f_T$, respectively, and Z is a variable magnification ratio, where $Z=f_T/f_W$.

11. A Keplerian variable magnification finder comprising, in order from an object side:

an objective system having a positive refracting power as a whole;

an image erecting system for erecting an intermediate image formed by said objective system; and an eyepiece system having a positive refracting power as a whole;

said objective system including, in order form an object side:

a first lens unit having a negative retracting power;

a second lens unit having a positive refracting power; and a third lens unit having a positive refracting power, said second lens unit and said third lens unit being movable along an optical axis when magnification is changed, each of said first lens unit, said second lens unit, and said third lens unit being constructed with a single lens, and both surfaces of the single lens of said second lens unit being configured to be aspherical, both surfaces of single lenses of said second lens unit and said third lens unit are configured to be aspherical, both surfaces of the single lens of said first lens unit are configured to be aspherical, and the following condition is satisfied:

$$0.1 < |f_1/(f_S Z)| < 0.4$$

where $f_1$ is a focal length of said first lens unit, $f_S$ is an intermediate focal length of said objective system, where $f_S=(f_W f_T)^{1/2}$ when focal lengths of said objective system at low and high magnification positions are represented by $f_W$ and $f_T$, respectively, and Z is a variable magnification ratio, where $Z=f_T/f_W$.

12. A Keplerian variable magnification finder comprising, in order from an object side:

an objective system having a positive refracting power as a whole;

an image erecting system for erecting an intermediate image formed by said objective system; and an eyepiece system having a positive refracting power as a whole, said objective system including, in order from an object side:

a first lens unit having a negative refracting power;

a second lens unit having a positive refracting power; and a third lens unit having a positive refracting power, said second lens unit and said third lens unit being movable along an optical axis when magnification is changed, each of said first lens unit, said second lens unit, and said third lens unit being constructed with a single lens, and both surfaces of the single lens of said third lens unit being configured to be aspherical, both surfaces of the single lens of said first lens unit are configured to be aspherical, and the following condition is satisfied:

$$0.1 < |f_1/(f_S Z)| < 0.4$$

where $f_1$ is a focal length of said first lens unit, $f_S$ is an intermediate focal length of said objective system, where $f_S=(f_W f_T)^{1/2}$ when focal lengths of said objective system at low and high magnification positions are represented by $f_W$ and $f_T$, respectively, and Z is a variable magnification ratio, where $Z=f_T/f_W$.

13. A Keplerian variable magnification finder comprising, in order from an object side:

an objective system having a positive refracting power as a whole;

an image erecting system for erecting an intermediate image formed by said objective system; and an eyepiece system having a positive refracting power as a whole;

said objective system including, in order form an object side:

a first lens unit having a negative refracting power;

a second lens unit having a positive refracting power; and a third lens unit having a positive refracting power, said second lens unit and said third lens unit being movable along an optical axis when magnification is changed, each of said first lens unit, said second lens unit, and said third lens unit being constructed with a single lens, and both surfaces of the single lens of said second lens unit being configured to be aspherical, both surfaces of the single lens of said second lens unit and said third lens unit are configured to be aspherical, both surfaces of the single lens of said first lens unit are configured to be aspherical, and the following condition is satisfied:

$$0.2 < f_3/(f_S Z) < 0.5$$

where $f_3$ is a focal length of said third lens unit, $f_S$ is an intermediate focal length of said objective system, where $f_S=(f_W f_T)^{1/2}$ when focal lengths of said objective system at low and high magnification positions are represented by $f_W$ and $f_T$, respectively, and Z is a variable magnification ratio, where $Z=f_T/f_W$.

14. A Keplerian variable magnification finder comprising, in order from an object side:
- an objective system having a positive refracting power as a whole;
- an image erecting system for erecting an intermediate image formed by said objective system; and
- an eyepiece system having a positive refracting power as a whole,
- said objective system including, in order from an object side:
  - a first lens unit having a negative refracting power;
  - a second lens unit having a positive refracting power; and
  - a third lens unit having a positive refracting power, said second lens unit and said third lens unit being movable along an optical axis when magnification is changed, each of said first lens unit, said second lens unit, and said third lens unit being constructed with a single lens, and both surfaces of the single lens of said third lens unit being configured to be aspherical, both surfaces of the single lens of said first lens unit are configured to be aspherical, and the following condition is satisfied:

$$0.2 < f_3/(f_S Z) < 0.5$$

where $f_3$ is a focal length of said third lens unit, $f_S$ is an intermediate focal length of said objective system, where $f_S=(f_W f_T)^{1/2}$ when focal lengths of said objective system at low and high magnification positions are represented by $f_W$ and $f_T$, respectively, and Z is a variable magnification ratio, where $Z=f_T/f_W$.

* * * * *